US007960648B2

(12) United States Patent
McGinley et al.

(10) Patent No.: US 7,960,648 B2
(45) Date of Patent: Jun. 14, 2011

(54) ENERGY SAVING CABLE ASSEMBLIES

(75) Inventors: James W. McGinley, Barrington, IL (US); Donald Rimdzius, Addison, IL (US); Valerie McGinley, Barrington, IL (US); Dominic James Hogan, Appleton, WI (US)

(73) Assignee: Voltstar Technologies, Inc., Schaumburg, IL (US)

( * ) Notice: Subject to any disclaimer, the term of this patent is extended or adjusted under 35 U.S.C. 154(b) by 333 days.

(21) Appl. No.: 12/251,882

(22) Filed: Oct. 15, 2008

(65) Prior Publication Data

US 2009/0295232 A1    Dec. 3, 2009

Related U.S. Application Data

(63) Continuation-in-part of application No. 12/176,261, filed on Jul. 18, 2008, which is a continuation-in-part of application No. 12/127,592, filed on May 27, 2008.

(51) Int. Cl.
*H01B 11/06* (2006.01)
(52) U.S. Cl. ......................................... 174/36
(58) Field of Classification Search ................ 174/74 R, 174/78, 84 R
See application file for complete search history.

(56) References Cited

U.S. PATENT DOCUMENTS

| | | | |
|---|---|---|---|
| 2,759,159 A | 8/1956 | Teetor | |
| 2,907,855 A | 10/1959 | Hedges | |
| 2,979,624 A | 4/1961 | Wilby | |
| 3,524,029 A | 8/1970 | Laff | |
| 3,974,347 A * | 8/1976 | Lockard | 200/6 R |
| 4,323,762 A | 4/1982 | Ervin et al. | |
| 4,463,228 A * | 7/1984 | Osika | 200/51 R |
| 4,482,789 A | 11/1984 | McVey | |
| 4,645,942 A | 2/1987 | Nilssen | |
| 4,647,735 A | 3/1987 | Sicher | |
| 5,070,219 A | 12/1991 | Grosskueger et al. | |
| 5,081,627 A * | 1/1992 | Yu | 714/46 |
| 5,181,902 A | 1/1993 | Erickson et al. | |
| 5,193,665 A | 3/1993 | Jankow | |

(Continued)

FOREIGN PATENT DOCUMENTS

JP    2000-102184 A    4/2000

(Continued)

OTHER PUBLICATIONS

Connor, Margery, "Tightened Power-Efficiency Regulations Force Power Supplies to Keep Up," EDN, Feb. 21, 2008, www.edn.com Internet publication (3 pages).

(Continued)

*Primary Examiner* — William H Mayo, III
(74) *Attorney, Agent, or Firm* — Greenberg Traurig, LLP

(57) ABSTRACT

A cable assembly for use with any power cable for an electrical device, the cable assembly including a remotely locatable switch for connecting or disconnecting the electrical device from power draw. Also, a cable assembly for a power device such as a charger for providing output power to an electronic device is disclosed, the cable assembly including two pairs of wires wherein a first pair provides output power for the electronic device and a second pair includes a switch for turning off the charger. The cable assembly allows the switch to be located remotely from a charger housing for the converter circuitry and remotely from a power source such as an outlet, and allows the switch to be generally co-located with and operable at the connector for connecting the power device with the electronic device.

52 Claims, 6 Drawing Sheets

U.S. PATENT DOCUMENTS

| | | | |
|---|---|---|---|
| 5,220,152 | A | 6/1993 | Doran |
| 5,321,313 | A | 6/1994 | Oberhauser |
| 5,329,083 | A | 7/1994 | Lai |
| 5,338,218 | A | 8/1994 | Haas |
| 5,359,540 | A | 10/1994 | Ortiz |
| 5,408,059 | A | 4/1995 | Goble |
| 5,494,449 | A | 2/1996 | Chioo |
| 5,594,672 | A | 1/1997 | Hicks |
| 5,721,934 | A | 2/1998 | Scheurich |
| 5,734,206 | A | 3/1998 | Keizer et al. |
| 5,911,586 | A | 6/1999 | Wintergerst |
| 6,035,408 | A | 3/2000 | Huang |
| 6,134,612 | A | 10/2000 | Bailey et al. |
| 6,255,800 | B1 | 7/2001 | Bork |
| 6,272,030 | B1 | 8/2001 | Oomura |
| 6,461,117 | B2 | 10/2002 | Haas |
| 6,461,176 | B1 | 10/2002 | Haas |
| 6,532,328 | B1 * | 3/2003 | Kline ............... 385/101 |
| 6,633,932 | B1 | 10/2003 | Bork et al. |
| 6,754,092 | B2 | 6/2004 | McDowell et al. |
| 6,774,603 | B2 | 8/2004 | Liao |
| 6,777,828 | B1 | 8/2004 | Rothstein |
| 6,790,093 | B2 | 9/2004 | Tanaka et al. |
| 6,825,427 | B2 * | 11/2004 | Jenks ............... 200/51.12 |
| 6,865,094 | B2 | 3/2005 | Malik et al. |
| 6,874,093 | B2 | 3/2005 | Bell |
| 6,895,516 | B2 | 5/2005 | Odaohhara |
| 7,049,937 | B1 * | 5/2006 | Zweig et al. ............... 340/310.11 |
| 7,106,302 | B2 | 9/2006 | Chen et al. |
| 7,132,763 | B2 | 11/2006 | Rendic |
| 7,183,743 | B2 | 2/2007 | Geiger |
| 7,184,258 | B2 | 2/2007 | Lai |
| D543,147 | S | 5/2007 | Ng |
| 7,221,284 | B2 * | 5/2007 | Scherer et al. ............ 340/815.45 |
| 7,224,086 | B2 | 5/2007 | Germagian et al. |
| 7,516,343 | B2 | 4/2009 | Bhogal et al. |
| 7,544,909 | B2 * | 6/2009 | Dhir ............... 200/51.12 |
| 7,597,570 | B2 | 10/2009 | So |
| 7,635,273 | B2 | 12/2009 | Buzil et al. |
| 2006/0152867 | A1 | 7/2006 | Bonasia et al. |
| 2006/0194467 | A1 | 8/2006 | Beasley et al. |
| 2006/0278794 | A1 | 12/2006 | Rast |
| 2008/0054845 | A1 | 3/2008 | Wang |
| 2008/0059816 | A1 | 3/2008 | Paniagua et al. |
| 2008/0170060 | A1 | 7/2008 | Chen |
| 2008/0222431 | A1 | 9/2008 | Paniagua et al. |
| 2009/0177906 | A1 | 7/2009 | Paniagua, Jr. et al. |
| 2009/0295226 | A1 | 12/2009 | Hodges |
| 2010/0001684 | A1 | 1/2010 | Eastlack |
| 2010/0001685 | A1 | 1/2010 | Eastlack |
| 2010/0041262 | A1 | 2/2010 | Chesneau |

FOREIGN PATENT DOCUMENTS

| | | |
|---|---|---|
| JP | 2002-151221 | 5/2002 |
| JP | 2002-469544 A | 5/2002 |

OTHER PUBLICATIONS

Wallman, Dana, "Green Energy, A new charging solution conserves electricity by cutting off power to fully charged gadgets," Laptop Magazine, May 2008 (1 page).

ECNMag.com, "Brainstorm—Portable Power, Nov. 1, 2007," ECNMag, Nov. 1, 2007, www. ecnmag.com Internet publication (2 pages).

Lombardi, Candace, "Your cell phone is charged—please unplug," CNET News.com, Sep. 21, 2006, www.news.com Internet publication (3 pages).

Bombippy.com, "Is phantom load really a wall wart?", Nov. 15, 2007, www.bombippy.com Internet publication (3 pages).

Author unknown, "Phantom Load Killers," May 20, 2006, cbll.net Internet publication, http://cbll.net/weblog/post/index/279/Phantom-Load-Killers, (2 pages).

Alt, Marc, "The gadget guru," "clever strip," Mar. 2008, Domino Magazine, p. 48 (1 page).

Houghton, Stuart, "Nokia unveils eco-charger," Apr. 29, 2008, www.pocketpicks.com Internet publication (5 pages).

NokNok.tv, "Zero waste Nokia charger concept unveiled," Apr. 29, 2008, noknok.tv Internet publication (4 pages).

Yinli, Electronic Industry Co. Ltd. "AC/DC Adapter," yinli.manufacturer.globalsources.com Internet publication (2 pages); Date Stamped: Nov. 22, 2007.

Zhejiang Lianlong Electron & Electric Appliances Co., Ltd. "500 mA Plug-in AC/DC Adapter," lianlong.manufacturer.globalsources.com Internet publication (2 pages); Date Stamped: Nov. 22, 2007.

TLC Direct, 13 Amp RCD Adaptor, www.tlc-direct.co-uk Internet publication (2 pages); Date Stamped: Nov. 22, 2007.

Duronic "3v 4.5v 6v 7.5v 9v 12v DC Regulated Power Supply 1200mA," Amazon.com.uk Internet publication (7 pages); Nov. 22, 2007 [see item 10 below].

Hama, "Universal 2.5A Stabilized Power Supply," Amazon.com.uk Internet publication (3 pages); Date Stamped: Nov. 22, 2007.

Greenplug www.greenplug.us. Internet publication (4 pages); Date Stamped: Jun. 3, 2008.

Vrej Barkhordarian, Power MOSFET Basics, Oct. 25, 2005, International Rectifier, (13 pages); El Segundo, California.

NokNok.tv, NokNok - Tap into your Nokia's hidden talents, (4 pages); http://noknok.tv/news/zero-waste-nokia-charger-concept-unveiled/; Date Stamped: Jun. 3, 2008.

Green Plug, One Plug - One Planet, (2 pages); http://www.greenplug.us/oneplug.html; Nov. 2007 [see item 14 below].

amazon.co.uk, 3v 4.5v 6v 6.5v 9v 12v DC Regulated Power Supply 1200mA, (2 pages); http://www.amazon.co.uk/4-5v-Regulated-Power-Supply; Date Stamped: Nov. 22, 2007.

de-direct.co.uk, 13 Amp RCD Adaptor part of RCD Plug-in Adaptors, (2 pages); BRJ03; Date Stamped: Nov. 22, 2007.

de-direct.co.uk, 13 Amp RCD Adaptor part of Rcd Plug-in Adaptors (2 pages); TLARCD; Date Stamped: Nov. 22, 2007.

www.youtube.com, Exclusive Nokia Zero Waste Charger concept (1 page); http://www.youtube.com/watch?v=JIXEv0jWR-8; Apr. 29, 2008.

Green Plug, One Plug - One Planet, (13 pages); http://web.archive.org/web/2007011[ ]/www.greenplug.us/[] ; Date Stamped: Nov. 2007 [p. 13 is PDF link from p. 11].

* cited by examiner

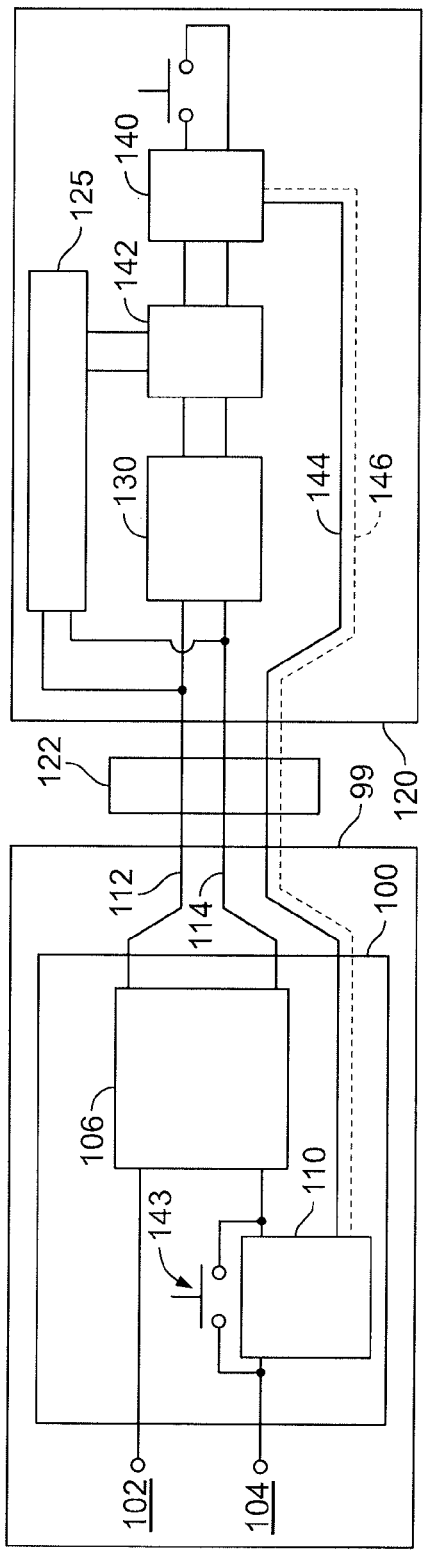
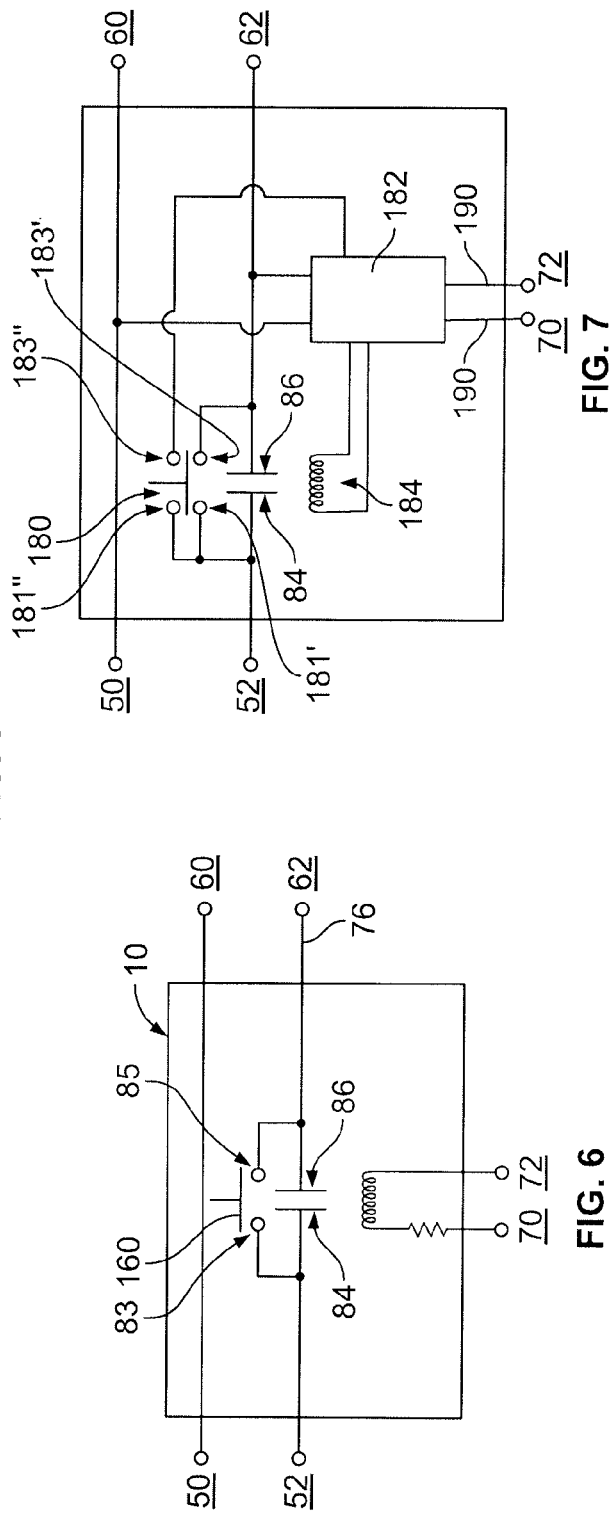
FIG. 5
FIG. 6
FIG. 7

ENERGY SAVING CABLE ASSEMBLIES

CROSS-REFERENCE TO RELATED APPLICATION(S)

The present application is related to U.S. Ser. No. 12/251,898, filed concurrently, titled "Energy Saving Cable Assemblies," and the present application is a continuation-in-part of U.S. Ser. No. 12/176,261, titled "Energy Saving Cable Assemblies," and filed Jul. 18, 2008, which is a continuation-in-part of U.S. Ser. No. 12/127,592, titled "Energy-Saving Power Adapter/Charger," and filed May 27, 2008, the entirety of each being incorporated herein by reference.

FIELD OF THE INVENTION

The invention relates to power saving cable assemblies, in particular, cable assemblies for use with electrical devices having on-board rechargeable batteries and, more particularly, to cable assemblies for laptop computers or other electrical devices capable of sending an electrical signal indicating the electrical device has been turned on so the cable assembly connects power to the electrical device and shifts from a disconnect state in which power drain commonly known as "phantom" load is substantially reduced or eliminated.

BACKGROUND

Currently, it is known to use power adapters and chargers for charging or powering a variety of electronic devices having an on-board battery or power supply, and the chargers provide power to the battery. As used herein, the term "charger" refers to devices that provide a step in power (i.e., step power from an input voltage to an output voltage), convert power (i.e., convert input alternating current (AC) to output direct current (DC)) or both.

For an electrical device in the form of a laptop computer, for instance, the power cable assembly provided is essentially a charger, the cable assembly being detachable and including a "brick" with internal circuitry for converting power. The cable assembly generally has two connection points, a first one for receiving power such as from a power outlet and a second one for connecting with and conveying power to an input on the laptop computer itself. The first connection point is generally prongs or blades that are inserted into the power outlet for receiving power therefrom which, in the United States, is alternating current power. The second connection point is generally a connector plug removably received in a socket of the laptop. As examples, the input power may be alternating current of a first voltage (such as 110/120V), and the output power may be direct current of a second, generally lower, voltage such as 19.5V.

Because of their on-board power supply, many electrical devices are capable of providing an electrical signal corresponding to when the electrical device is turned on, though the devices are generally not equipped to specifically do so. For some electrical devices, such as laptop computers and at least some MP3 players, the electrical device itself is relied upon to power a separate device, such as a memory device commonly and variously referred to as a thumb drive or USB drive or USB plug that is connected (both physically and electrically for use as a memory device) via a USB connector on one end received in a USB port on the electrical device. When a laptop computer, for instance, is powered on, a USB plug connected with the laptop computer is automatically powered on by the laptop computer and typically includes an LED light that indicates such. When the laptop computer is turned off, it automatically turns off the USB plug, and the LED light turns off.

It is not uncommon for laptop computers to be disconnected from their power cable assemblies, as such are designed for portability, while the cable assembly itself remains connected with the power outlet. Accordingly, the cable assembly continues to draw power from the wall outlet. This power draw is one type of drain known as phantom load and is wasted energy. One of the reasons the cable assembly is left is because the intent for the use of the laptop is such that the on-board battery life (generally in the order of 2 to 4 hours) is sufficiently long for the user to return the laptop to the cable assembly before the life is reached. Other reasons may be that the user transports the laptop computer between two different sites at which separate cable assemblies are maintained, such as an office and a home. In any event, it is not uncommon for the cable assembly to be secured with the power outlet, with the remote first connection plug or prongs, in a manner that makes it tedious or difficult to unplug the cable assembly from the outlet when the laptop is disconnected, such as when the outlet is behind furniture or the cable assembly is routed through office furniture.

Accordingly, a user may plug the cable assembly prong into the power outlet of their choice (whether it is behind furniture or some other obstruction), and may leave the connector end for the electrical device in a place that is convenient for connecting and disconnecting the electrical device. However, by leaving the cable assembly connected with the outlet, power draw continues. To be more precise, this draw is phantom load, that is, residual power consumption by power cable assemblies or other devices when not connected to their host electronic device (i.e., a laptop computer), or when the electronic device is shut off.

Phantom load is becoming a greater issue for the public. Electrical devices that result in the described phantom load are continually increasing in per capita usage, populations increase exponentially, and great portions of the world's population are gaining the discretionary capital that enables the purchase of such devices. Energy is becoming more expensive on a monetary basis, and energy production overwhelmingly has an environmental impact, such as fossil fuel or nuclear energy.

Extensive effort has been and continues to be put into development of energy-efficient devices of all sorts. The "Energy Star" program sponsored by the United States Environmental Protection Agency and the United States Department of Energy is well known, though principally for energy efficiency appliances and building products such as glass doors and windows. In parallel with Energy Star standards efforts, a variety of state and federal laws have been enacted that are directed toward external power-supply products, which includes power devices or chargers for portable electronic devices.

Nokia has announced a prototype device from Nokia that operates with a mechanical switch. Specifically, the Nokia device has a housing end receivable in a power receptacle and including internal circuitry for the charger/adapter functions. A button is located on the housing for turning the Nokia device on, and the circuitry automatically turns off by releasing the button.

In order to be a true "zero-waste" device, the power input (i.e., AC input) to the power device itself must be cut. Therefore, the location within the circuit at which the power is cut is central. In other words, a switch that merely cuts the output power from the connector (such as might be used to prevent overcharging of a battery) while the converter/adapter circuitry remains under power is not a "zero-waste" device because the internal circuitry is allowed to draw power, the effect being no different than simply removing the electronic device itself.

The paradigm for Nokia, then, appears to be to provide a "zero-waste" device by having the switch co-located with the input to the charger. However, as the use of many detachable power chargers is described above, the charger input is often in a difficult-to-reach position, resulting in people not bothering to unplug the device. The Nokia device still requires access before and after use to turn the device on and off.

Accordingly, it is desirable and there is a need for an improved power device, charger or otherwise, for reducing phantom load when a portable electrical device is turned off or disconnected from the power cable assembly or power device or otherwise not intended to be drawing power from the power device. It is also desirable to provide a device that allows disconnection of power to an electrical device, the electrical device continuing to utilize its manufacturer-supplied power cord.

SUMMARY

In accordance with an aspect, a cable assembly is disclosed for use with an electrical device, the cable assembly including a first portion for connection with and receipt of input power from a power source a second portion for electrical connection with and for providing output power to a power cord of the electrical device, a third portion for electrical connection with the electrical device, and a switch circuitry electrically connected between the first and second portions and to the third portion, the switch circuitry delivering the output power to the power cord when an electrical signal is received from the electrical device via the third portion indicating that the electrical device is in an on state, the switch circuitry further automatically disconnecting input power thereto when no electrical signal is received from the electrical device via the third portion, the disconnection of input power serving to disconnect power to the power cord.

In some forms, cable assembly includes a plug body having a first side including the first portion in the form of prongs for electrical connection with the power source in the form of a power outlet, and having a second side in the form of a secondary power outlet for receiving prongs of the electrical device power cord for delivering electrical power thereto. The switch circuitry may be located in the plug body.

In some forms, the cable assembly includes a first plug body having a first side including the first portion in the form of prongs for electrical connection with the power source in the form of a power outlet, a second plug body in the form of a secondary power outlet for receiving prongs of the electrical device power cord for delivering electrical power thereto, and a cable extending between the first and second plug bodies for delivering electrical power from the first plug body to the secondary power outlet and the electrical device power cord received therein.

In some forms, the switch circuitry includes a pair of relay contacts shifted into electrical contact for closing the switch circuitry to provide power to the power cord. The cable assembly may further include a user-actuated switch, actuation of the switch providing a signal to connect the relay contacts. The user-actuation switch may be actuated a period of time to provide an initial connection of the relay contacts, the contacts remaining in contact for maintaining the switch circuitry in a closed position. The switch circuitry may include a microprocessor for recognizing the electrical signal, and the microprocessor may effect connection of the relay contacts to close the switch circuitry in response to receipt of the electrical signal.

In accordance with another aspect, a cable assembly for use with an electrical device having an on-board battery is disclosed, the electrical device including a charger having a power plug for receiving power and a connector for removable connection with the electrical device for delivering power to the battery, and the electrical device including a connector port for electrical connection with further devices, the cable assembly comprising a plug body including prongs for electrical connection with a power outlet to receive input power therefrom, a socket for receipt of and electrical connection with the charger power plug for delivering output power thereto, the charger converting said output power and delivering power to the laptop computer battery, a cord having a first end extending from the plug body, a plug connected at a second end of the cord, the plug being receivable in the electrical device connector port for receiving an electrical signal therefrom, and a switch circuitry electrically connected with the plug, the switch circuitry automatically moving to an open position when the electrical signal from the connector port is not received by the plug, the open position cutting input power from the power outlet and cutting output power to the charger power plug.

In some forms, the cable assembly is adapted for use with the electrical device in the form of a laptop computer. The plug may be configured as a USB plug electrically connectable to the connector port in the form of a USB port.

In some forms, the switch circuitry includes a microprocessor that monitors the electrical signal and that opens and closes the switch circuitry to disconnect or connect the output power to the electrical device power cord.

In some forms, the switch circuitry includes first and second contacts, at least one of the contacts being physically movable to effect connection and disconnection of an electrical path through the first and second contacts, wherein the switch circuitry at least maintains the contacts in physical and electrical connection when the electrical signal is received from the plug. The switch circuitry may permit disconnection of the contacts in the absence of the electrical signal being received from the plug. The switch circuitry may automatically disconnect the contacts in the absence of the electrical signal being received from the plug. The switch circuitry may automatically disconnect the contacts after a predetermined period of time.

In some forms, the cable assembly may further include a user-operated portion for connection of the contacts to connect the input power to the output power and to permit the output power to be delivered to the charger power plug.

In some forms, the cable assembly may further include a user-operated switch mechanism, wherein the switch circuitry includes a microprocessor for controlling connection of the input power to the output power, whereby operation of the switch mechanism by a user provides a signal to the microprocessor portion for connecting the input power to the output power.

In accordance with an additional aspect, a method of reducing power draw by a charger of an electrical device, the method comprising the steps of electrically connecting a cable assembly with a power outlet for receiving input power therefrom, electrically connecting the charger to the cable assembly for receiving output power therefrom, electrically connecting a connector plug with the electrical device, monitoring an electrical signal from the electrical device to the connector plug, the electrical signal indicating proper connection of the electrical device with the connector plug and indicating an on state for the electrical device, and automatically disconnecting output power to the charger in the absence of the electrical signal.

In some forms, the method further includes the step of connecting electrical contacts for providing output power to the charger. The step of connecting the electrical contacts may be performed in response to presence of the electrical signal from the connector plug indicating an on state for the electrical device.

In accordance with a further aspect, a method of reducing power draw by a charger of an electrical device, the method comprising the steps of electrically connecting a cable assembly with a power outlet for receiving input power therefrom, electrically connecting the charger to the cable assembly for receiving output power therefrom, electrically connecting a connector plug with the electrical device, monitoring an electrical signal from the electrical device to the connector plug, the electrical signal indicating proper connection of the electrical device with the connector plug and indicating an on state for the electrical device, and automatically disconnecting output power to the charger after a predetermined period of time.

BRIEF DESCRIPTION OF THE DRAWINGS

In the Figures,

FIG. 5 is a representative circuit diagram of a second form of a cable assembly, the cable assembly for use with an electrical device having an on-board power supply and being capable of providing an electrical signal indicating the need to draw power, the cable assembly capable of connecting and disconnecting power from the power outlet to the electrical device in response to the presence or absence of the electrical signal;

FIG. 6 is a representative circuit diagram of a form of a cable assembly having a mechanical actuator for turning on the cable assembly for connecting power therethrough;

FIG. 7 is a representative circuit diagram of a form of a cable assembly including mechanical actuator for turning on the cable assembly for connecting power therethrough, the mechanical actuator also for turning off the cable assembly for disconnecting power therethrough, the cable assembly including a controller responsive to the mechanical actuator to turn power on or off in the cable assembly, the controller also for controlling power draw through the cable assembly such as with a timer, and the controller further capable of monitoring a power state of an electrical device and turning the cable assembly off based on a lack of power draw by an electrical device through outputs of the cable assembly; and FIG. 8 is a partial fragmentary view of a form of the cable assembly of FIG. 5, the cable assembly for use with an electrical device having an on-board power supply, the electrical device in the form of a laptop computer, and the cable assembly being integrated with a power assembly in the form of a charger for receiving and converting and transmitting power from a power outlet in a converted state, the electrical device including a user-actuated switch for turning the cable assembly and power assembly on;

FIG. 9 is a partial fragmentary view of a further form of the cable assembly of FIG. 5, the cable assembly for use with an electrical device having an on-board power supply, the electrical device in the form of a laptop computer, and the cable assembly being integrated with a power assembly in the form of a charger for receiving and converting and transmitting power from a power outlet in a converted state, the cable assembly and power assembly including a user-actuated switch for turning the cable assembly and power assembly on.

DETAILED DESCRIPTION

Figure 1:
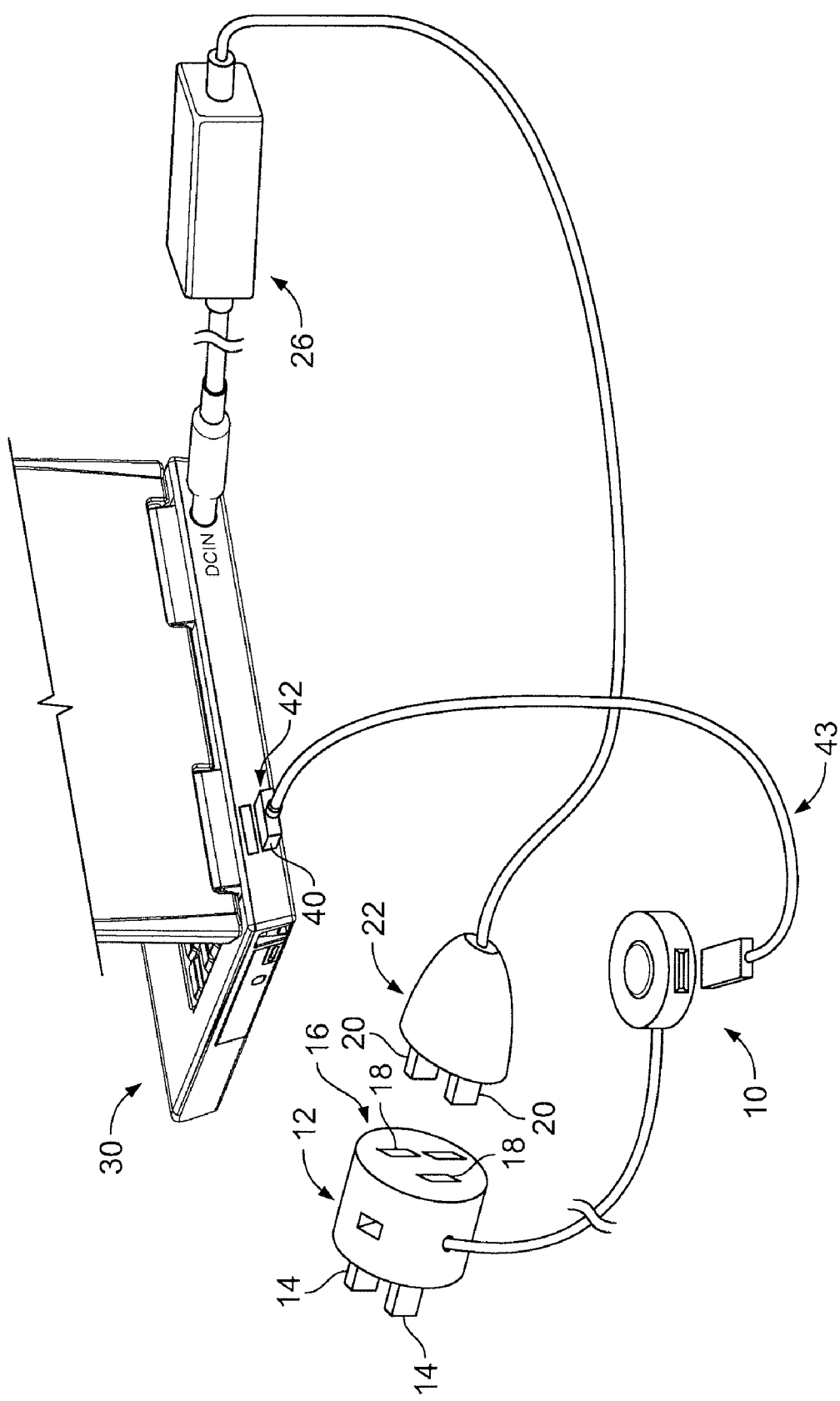
FIG. 1 is a partial fragmentary view of a form of a cable assembly, the cable assembly for use with an electrical device having an on-board power supply, the electrical device in the form of a laptop computer, and the electrical device utilizing a power assembly referred to herein as a charger for receiving and converting and transmitting power from a power outlet in a converted state, the cable assembly recognizing the electrical device being connected and being turned on and being turned off or disconnected, the cable assembly connecting and disconnecting power from the power outlet to the charger.

Referring initially to FIG. 1, an energy-saving cable assembly 10 in a form of the present invention that recognizes "on" and "off" states of an electrical device and connects and disconnects power draw from a power source accordingly. As illustrated, the cable assembly 10 has a first portion at a first end in the form of a plug 12 including prongs 14 thereon for connecting with a power source or outlet (not shown), and a second portion in the form of a secondary plug 16 having openings 18 for receiving and electrically connecting with prongs 20 of a plug 22 of a power assembly 26 that is connectable to an electrical device such as a laptop computer 30. The cable assembly 10 further includes a third portion in the form of a connector 40 that is received by a port 42 of the laptop computer 30, the connector 40 in the present form being a USB connector remote from the first end and connected thereto via an electrical cord 43, and the port 42 being a corresponding USB port 42.

As will be described in greater detail below, the laptop computer 30, in its "on" state, monitors the USB port 42 and powers any device connected thereto such that an electrical signal is sent through the cable assembly USB connector 40 to activate or maintain the cable assembly 10 connected thereto in a corresponding "on" state. In its "on" state, the cable assembly 10 draws power from the power outlet and transmits the power to the power assembly 26 for conversion and delivery to the laptop computer 30. When the laptop computer 30 is turned off, the power to the USB port 42 is shut down, and the cable assembly 10 recognizes such to also disconnect power draw from the outlet.

For simplicity's sake, the form of the invention illustrated in FIG. 1 is generally described in use with an electrical device in the form of a laptop computer 30 having a USB port 42. However, it should be recognized that the form may easily be adapted to any electrical device having an on-board battery capable of sending an electrical signal that corresponds to an "on" state, the electrical signal being turned off when the electrical device itself is either in an "off" state or when the electrical device need not draw power.

Figure 2:
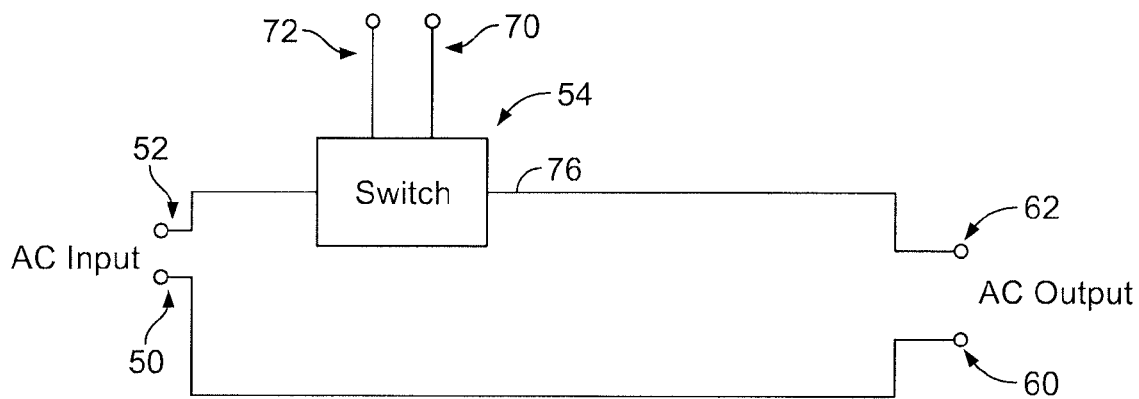
FIG. 2 is a generalized representational circuit diagram of the cable assembly of FIG. 1 including a switch circuitry for activating the cable assembly.

Turning now to FIG. 2, a generalized first form of an electrical circuit diagram for the cable assembly 10 is illustrated. The cable assembly 10 includes first and second inputs 50, 52 corresponding to the prongs 14 thereof for receiving electrical power from a power outlet. The first input 50 leads directly to a first cable output 60, while the second input 52 leads to switch circuitry 54. The switch circuitry 54 is electrically connected to first and second control lines 70, 72 which correspond to the USB plug 40 for electrically connecting with the laptop computer 30. In this manner, the switch circuitry 54 receives an electrical signal from the plug 40 when the laptop computer 30 is in its "on" state. The switch circuitry 54 further includes an output 76 that leads to a second cable output 62, the first and second cable outputs 60, 62 corresponding to the openings 18 of the secondary plug 16, as depicted in FIG. 1, for instance. In this manner, the switch circuitry 54 connects or disconnects power delivery from the power outlet to an electrical device (i.e., laptop computer 30) connected to the cable assembly 10 at the cable outputs 60, 62.

Figure 3:
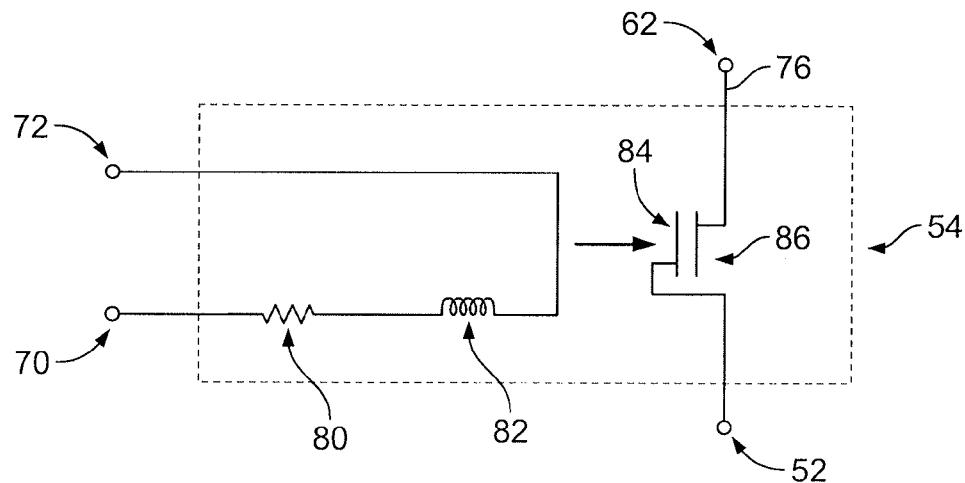
FIG. 3 is a first form of the switch circuitry of FIG. 2.

The switch circuitry 54 can be in many forms. In a typical application, the power received by the control lines 70, 72 is direct current. In FIG. 3, a form of the switch circuitry 54 is illustrated in which the control lines 70 are electrically connected through a resistor 80 and a relay coil 82 such as a mechanically-actuating solenoid. When actuated by electrical power received at the control lines 70, the relay coil 82 mechanically advances, thereby bringing together first and second relay contacts 84 and 86. The first relay contact 84 is electrically connected to the second input 52, and the second relay contact 86 is electrically connected to the second cable output 62. By bringing the contacts 84, 86 together, the electrical path between the input 52 and the second cable output 62 is closed, and the cable assembly 10 delivers power to secondary plug 16 and any device connected thereto.

As described herein, use of the terms "relay," "relay coil," or "latching relay," are generally referring to use of an electrical signal to power a coil, the coil operating to bring two plates or contacts of the relay together. Generally, the coil provides movement to the contacts in a particular direction based on current flow (i.e., voltage); as such, the direction may be reversed by reversing the voltage. However, reversing of voltage is not always practical or preferred. Instead, it may be preferred to include a first relay coil for joining the contacts when the first relay coil is activated by an electrical signal, and a second relay coil for separating the contacts when the second relay coil is activated by an electrical signal. It should also be understood that the contacts may be maintained in the closed position by continued application of the electrical signal to the relay coil, and cessation or cutting of the power to the relay allows the contacts to open. Finally, it should be understood that the contacts in the form of latching contacts may be coupled and electrically connected by the coil, and the contacts remain coupled despite the coil not receiving a continued supply of electrical power; in such a form, power must be reversed to the coil to unlatch the contacts or a second relay must be provided that, when energized, uncouples the contacts. These different forms of relays are well-known in the art, and their use is generally interchangeable depending on design consideration. As used herein, it should be understood that reference to one form incorporates substitution of the other forms.

Figure 4:
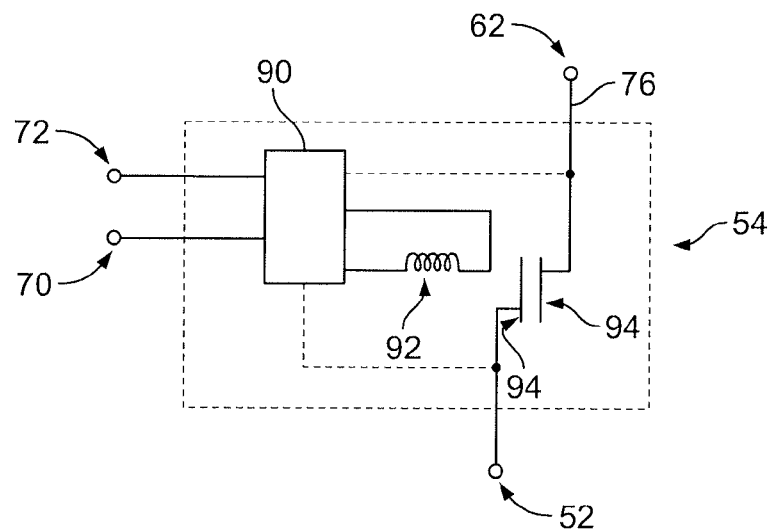
FIG. 4 is a second form of the switch circuitry of FIG. 3.

FIG. 4 shows a second form of the switch circuitry 54 including a controller, which may be a microprocessor or microcontroller or integrated chip circuit (IC) 90. In this form, the control lines 70, 72 are electrically connected to the IC 90 and, upon receiving an electrical signal, the IC 90 powers a relay coil 92 for electrically connecting relay contacts 94 that are electrically isolated from the relay coil 92 and IC 90, the input 52 and secondary cable output 62 thereby connected through the relay contacts 94. In alternative form, the input 52 and output 76 may be connected through the IC 90, which then controls the connection between the input 52 and the output 76; however, the input power current is too great in many applications to pass through the IC 90 without causing damage. Though tending to connote slightly different forms of a controller, the terms microprocessor and microcontroller are used herein interchangeably, and an IC is one form of such. It should also be noted that an integrated chip circuit may include one or more semiconductor chips and/or chip package assemblies, and/or other electrical components, and the term IC is used herein for the sake of convenience to refer to such an integrated chip circuit.

While FIGS. 3 and 4 show representative forms of switch circuitry 54, it will be clear to one skilled in the art that many types of switch circuitry 54 may be provided in which the electrical path between the input 52 and the output 76 (and, hence, the second cable output 62) is closed in response to an electrical signal received via the control lines 70, 72.

Turning now to FIG. 5, a second form of the invention is illustrated as a cable assembly 99 which incorporates switch circuitry in a power charger/converter 100. In detail, the charger 100 includes first and second inputs 102, 104 that generally correspond to prongs of a plug for connecting with a power source such as a power outlet. The charger 100 includes converter circuitry 106 for converting input power received at the inputs 102, 104 into output power, typically AC to DC conversion, if necessary, and step-down conversion to reduce the voltage. The first input 102 passes directly to the converter circuitry 106. The second input 104 passes to switch circuitry 110 similar to that described above. When the switch circuitry 110 is closed, the second input 104 is able to connect with the converter circuitry 106, and the output power from the charger 100 is provided at charger outputs 112, 114.

The charger outputs 112, 114 are connected to the electrical device 120. As shown, the cable assembly 99 including the charger 100 is removably connected to the electrical device 120 via a connection represented by 122. More specifically, the charger outputs 112, 114 are connected to the on-board battery 130 for the electrical device 120 for charging the battery 130.

The electrical device 120 is turned on or off by a user-actuated power switch 140. Solely for the sake of convenience while referring to a specific form without limiting it to such, the user-actuated power switch 140 is referred to herein as a laptop power button 140. The laptop power button 140 is electrically connected to the battery 130, typically through a microprocessor or integrated chip (IC) 142 at a low voltage. The IC 142 controls the main power to the electrical device 120 and operational components 125 thereof.

When the laptop power button 140 is actuated, an electrical signal is sent both to the IC 142 to activate the main power and, thus, to turn on the electrical device 120, and to the switch circuitry 110 in the charger 100. As shown, the connection between the laptop power button 140 and the charger 100 may be a single "hot" connection 144, or may be a paired connection including a secondary connection 146. The electrical signal sent to the charger 100 activates the cable assembly switch circuitry 110 to connect the second input 104 to the converter circuitry 106 so power is delivered therethrough and to the battery 130 and electrical device 120.

It is recognized that, at times, the on-board battery of an electrical device as described herein may be drained of power to a degree that a sufficient signal cannot be provided for activating the cable assembly to connect the power from the power source/outlet. Therefore, an override switch, shown as 143 in FIG. 5, can be provided to activate the cable assembly 99, for instance.

In one form, illustrated in FIG. 6 and being a modification of the cable assembly 10 of FIG. 1, a mechanical actuator 160 is provided for bringing contacts 83, 85 together so that input 52 is connected with second cable output 62. As can be seen, the mechanical actuator may simply be a button or the like that, when depressed, connects contacts 83, 85 through the actuator 160.

The mechanical actuator 160, at least in some forms, need only be depressed for a brief period of time, in the order of a few seconds or less that a second. For instance, once power is running through the circuit illustrated in FIG. 6, power in the electrical device or computer 30 is activated, which activates the control lines 70, 72, as described above. This powered actuation through the control lines 70, 72 serves to connect the contacts 84, 86, which themselves may be latching relay or solenoid-driven contacts. In another form, an IC may be present in the charger which turns the charger on and which provides an electrical signal to hold together/latch the contacts 84, 86. The charger may then operate for a predetermined period and shut off, or may operate for a predetermined period and then check for a threshold level of current draw in order to determine whether shutting down is appropriate.

Another form as a modification of the cable assembly 10 of FIG. 1 is shown in FIG. 7 utilizing input power along with a mechanical actuator 180. More specifically, the first input 50 is connected directly to the first cable output 60 and is also connected to an IC 182. The second input 52 is not directly connected to the IC 182, instead being electrically connected to a contact 84 like that described for FIG. 6 and being electrically connected to the mechanical actuator 180. In this form, the mechanical actuator 180 is a two-position mechanism, a first position connecting terminal 181' with terminal 183' and a second position connecting terminal 181" with terminal 183", each of the terminals 183' and 183" being electrically connected to the IC 182. This form can operate in a number of manners, either together or independently.

In one manner of operation, movement of the mechanical actuator 180 to the first position connects terminals 181' and 183,' which essentially provides power therethrough between input 52 and output 62. However, the power through the mechanical actuator 180 is preferably restricted (such as with a resistor, not shown, due to current requirements); preferably, then, the connection across the terminals 181' and 183' serves to activate the IC 182, which then powers a relay coil 184 to connect the contact 84 (which is connected with input 52) with contact 86 (which is connected with output 62). As described above, the connection between the terminals 181' and 183' need only be brief such that the IC 182 is powered to cause the contacts 84, 86 to latch.

Another feature of the circuit shown in FIG. 7 is the ability of the mechanical actuator 180 to turn the circuit (and the power therethrough) off. A brief movement of the mechanical actuator 180 to the second position, thus contacting the terminals 181" and 183", sends a signal to the IC 182 that either cuts power to the relay coil 184 (such a relay coil 184 that is holding the contacts 84, 86 together) or reverses the current on the relay coil 184 so that the contacts 84,86 are disconnected. Thus, the power from input 52 to output 62 is cut.

The circuit of FIG. 7 also utilizes the control lines 70, 72, described above for electrically receiving and monitoring the computer 30. That is, when the computer 30 is turned off, power to the control lines 70, 72 ceases, which indicates to the IC 182 that the power to the output 62 should be turned off. Again, the IC 182 then acts to disconnect the contacts 84, 86, either by cutting or by reversing power to the relay coil 184, or by powering a second relay coil (not shown).

The IC 182 can operate in other manners described herein, or in the related and incorporated applications. For instance, the IC 182 may have a timer (not shown) such that after a predetermined period of time the power to the relay coil 184 is disconnected, and the connection of the contacts 84, 86 is dependent on the control lines 70, 72 being powered. Alternatively, the contacts 84, 86 may be maintained in electrical contact for a sufficient period of time that a full charge of the battery of the electrical device is presumed, the time being in the order of 4 hours. In another form, the IC 182 may continue to monitor the mechanical actuator 180; should a user again depress the actuator 180 to make a connection across terminals 181' and 183', the IC 182 can be programmed to utilize the relay coil 184 to separate the contacts 84, 86. As is described in the co-pending parent applications of the present application, the mechanical actuator 180 may be a switch mechanism remotely-located from the inputs 50, 52 and generally co-located with or located proximate to the electrical device. Similarly, it should be recognized how a mechanical actuator may be used with the cable assembly 99 of FIG. 5 by connecting the mechanical actuator into the switch circuitry 110 in like manner to FIGS. 6 and 7, for instance.

Figure 8:
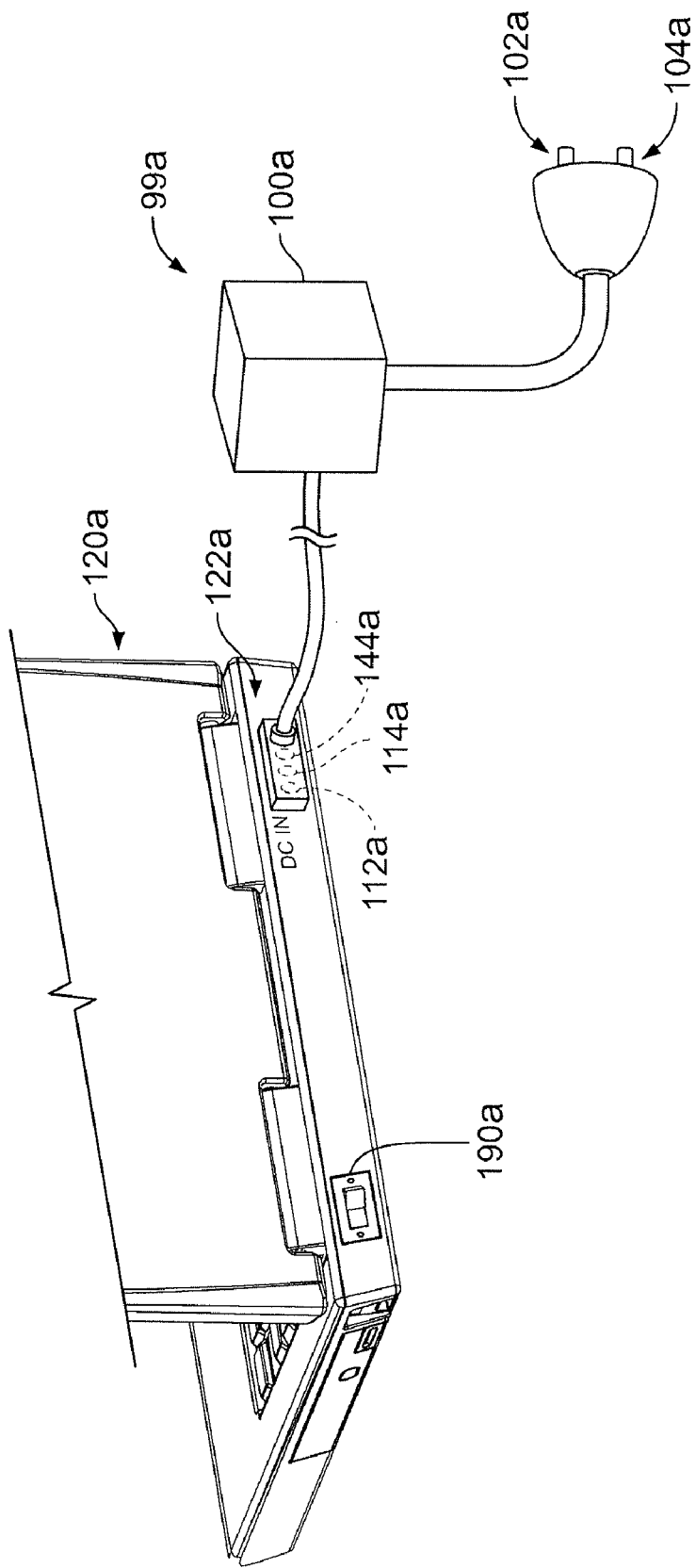

FIG. 8 shows a representation of a form or variation on the form of FIG. 5. A cable assembly 99a is shown including a charger 100a with a portion thereof including inputs 102a and 104a, such as prongs for connection with a power outlet (not shown). The charger 100a further includes a portion for connection with an electrical device 120a in the form of a laptop computer, the connection being via connection 122a. A user-actuated switch 190a is integrated into the electrical device 120a which can be used to signal an IC 142 (FIG. 5) of connection of the cable assembly 99a, and/or to activate switch circuitry 110 (FIG. 5) within the charger 100a to turn the charger 100a on. As can be seen, the connection 122a includes charger outputs 112a and 114a, as well as the hot connection 144a.

Figure 9:
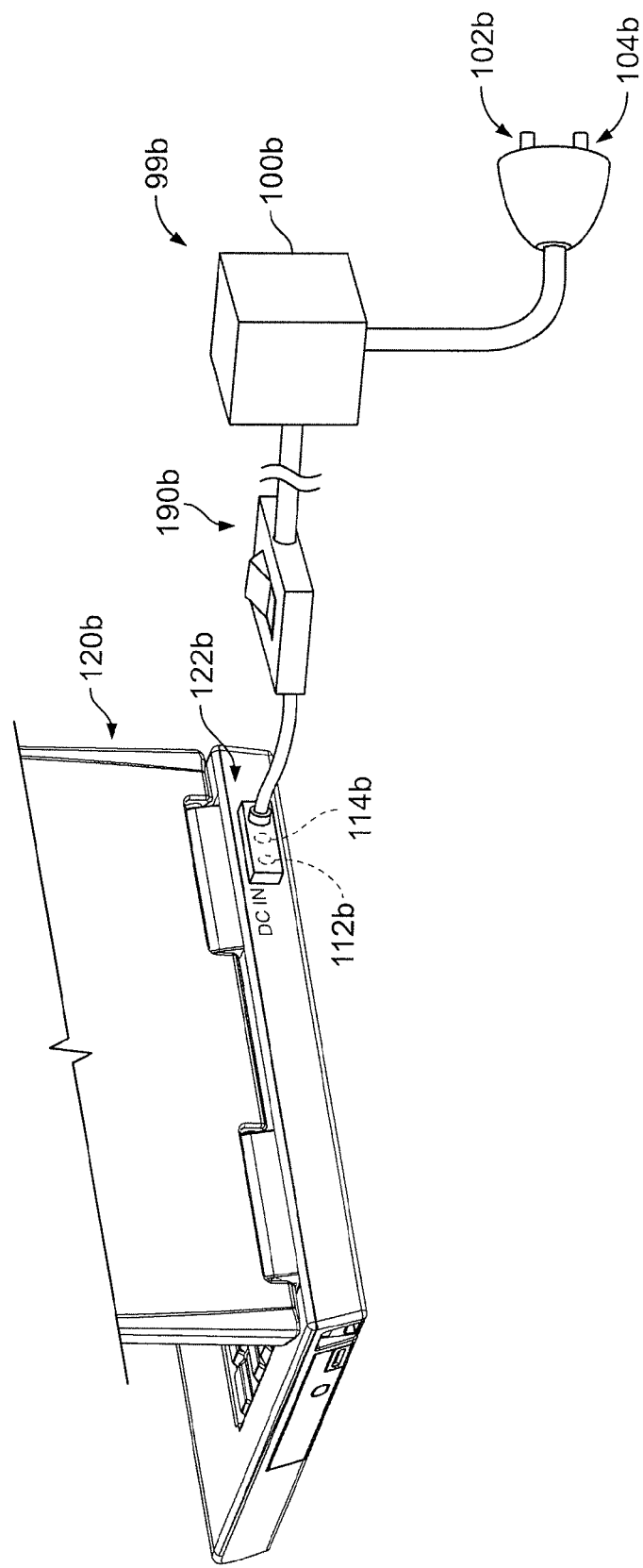

FIG. 9 shows a variation of the form of FIG. 5, specifically a form of a cable assembly 99b having a charger 100b integrated therein, as well as having a user-actuated switch 190b integrated therein. In this form, connection and disconnection of the cable assembly 99b from connection 122b involves only outputs 112b and 114b. The switch 190b is used to activate switch circuitry 110 as described for FIG. 5. It should be noted that in some forms, the switch circuitry 110 may monitor current through a hot connection 144b, and/or utilize a timer, as described in other forms. Additionally, the charger 100b may include a current sensor, as described in parent applications: for instance, the charger 100b including the converter circuitry 106 shown in FIG. 5 may have a current sensor located on charger outputs 112 and 114 (FIG. 5), the current sensor monitoring the current flow out of the converter circuitry 106 and, hence, to the electrical device 120b. The current sensor communicates the current flow to the switch circuitry 110 which disconnects the current flow from the input 104 to the converter circuitry 106 if the current flow falls below a threshold level. It should also be noted that the switch 190b may be incorporated into the same housing as the charger 100b.

The various forms described herein, including those described in the parent applications incorporated herein by reference in their entirety, may be provided with various combinations of features. A possible combination is a cable assembly having a plug for receiving a standard plug of a converter power assembly for the electrical device (like the plug 12 receiving plug 22 of the power assembly 26 in FIG.

1), and the cable assembly also having a second plug for receiving the DC connector of the power assembly, the second plug then being received by the electrical device. Such a cable assembly preferably includes a user-actuated switch for turning the cable assembly to the "on" state, and preferably includes a current sensor (such as in the second plug) that communicates with circuitry in the first plug, which in turn disconnects power to the power assembly when the current sensor indicates power draw has fallen below a threshold level.

As described, the cable assemblies are able to fully disconnect input power so that power or current draw is zero or negligible. The cable assemblies cut power to the electrical device and/or charger therefor prior to power conversion.

It should be noted that the cable assemblies 10 and 99, and modifications thereof, may be further modified by the features described in the co-pending parent applications of the present application. For instance, as noted above, the cable assemblies 10 and 99 may incorporate remotely-located switches of a variety of types, including a simple single-throw switch having a toggle member or momentary-contact switches or motion-activated switches, multi-paired cords, a variety of power conversion circuits, integrated circuits or microprocessors incorporating a number of control features such as timers and voltage or current sensors and/or delays therefor, power-limiting devices such as a fuse, additional relay coils for actively disconnecting relay contacts, and user-defined time periods for power connection through the cable assemblies, to name some.

It should be noted that many electrical devices such as laptop computer 30 utilize a 'soft' on/off button, which permits and/or expects some powered operation to continue despite the device being in the 'off' state. As a comparison, some television sets once utilized vacuum tubes and were provided with a 'hard' off, which turned off all power to the television set, and a 'soft' off which allowed the vacuum tube to remain warm. This allowed the picture tube to illuminate much faster when the vacuum tube was already warm. In essence, traditional forms of power chargers for laptop computers, for instance, are always warm and are always drawing power, thus resulting in the above-described phantom load.

For laptop computers, as an example, the present devices may be beneficially utilized in further manners. Over time, an on-board battery for a laptop computer will gradually lose its charge, and that charge will further be depleted by powering background operation of the laptop computer in the 'soft' off state. During this 'soft' off state, the operational components 125 (FIG. 5) may monitor the charge level of the on-board battery, though the cable assemblies and charger assemblies described herein allow substantially no power draw from the power source or outlet. When the operational components 125 recognize a sufficiently low charge level in the battery, the computer 30 may send a signal to the cable assemblies or charger assemblies described herein (such as through lines 144 and 146, or through a port such as 42, and such as to a microprocessor in the form of an integrated circuit (IC)), and the cable or charger assemblies can respond to this signal to power on, thus delivering power therethrough and to the on-board battery for charging. Once the operational components (again, in the 'soft' off state) recognize the battery has a sufficient charge level, the computer can either cease sending the signal or send a different signal so that the IC recognizes that the charger or cable assembly should turn off, and the IC effects such.

Figure 10:
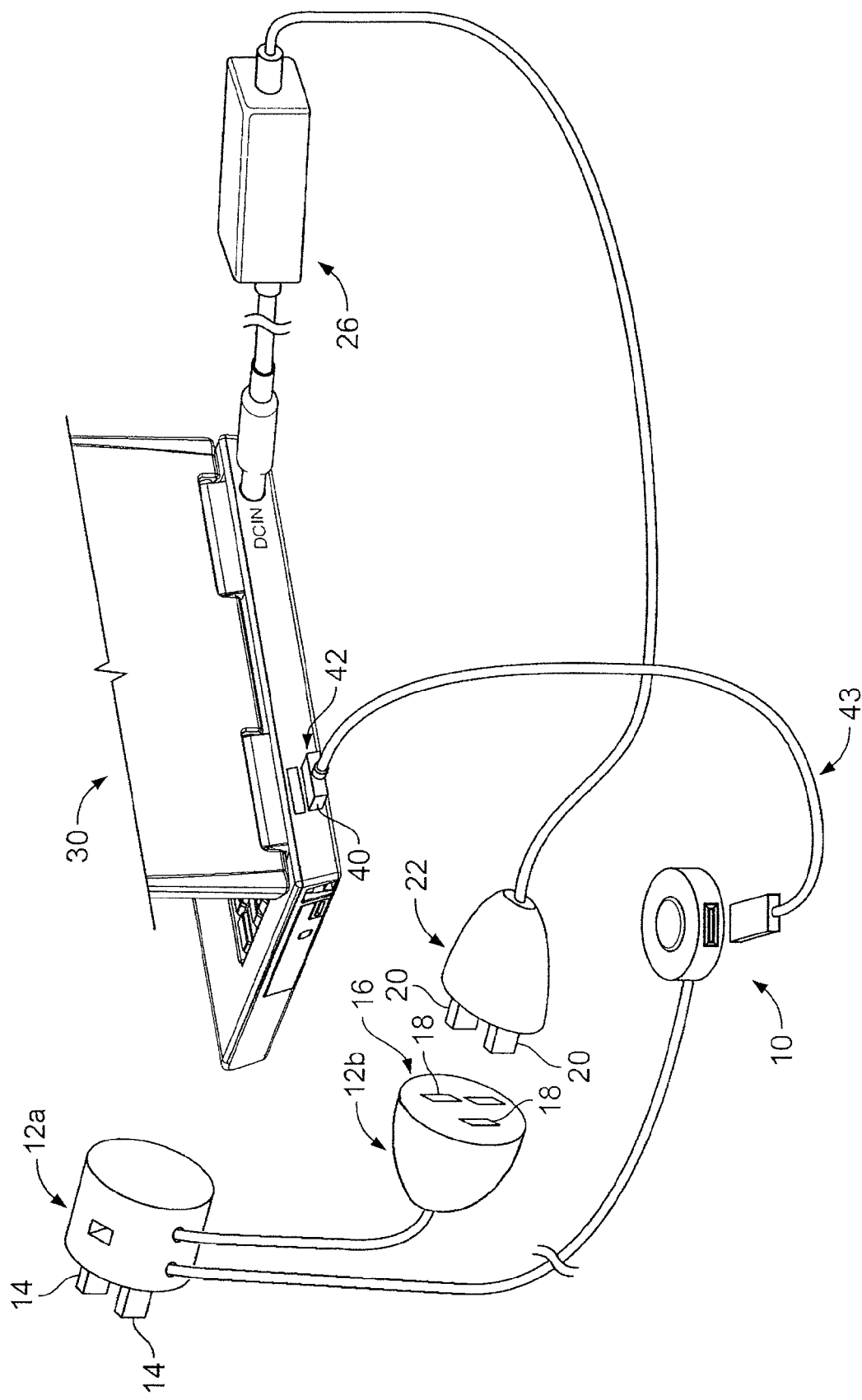
FIG. 10 is a partial fragmentary view similar to FIG. 1 in which the cable assembly has been modified to include a first plug body for connection with a power source such as a power outlet and to include a second plug body for connection with a power cord of the electrical device, the first and second plug bodies being electrically connected by a cord therebetween for delivering power from the power source to the electrical device.

Turning to FIG. 10, a modification of the cable assembly 10 of FIG. 1 is shown. Specifically, while the plug body 12 of FIG. 1 was shown as a single body (i.e., the components thereof are in a single housing), such a construction requires a considerable amount of packaging design and consideration of significant far-field electrical effects. Accordingly, FIG. 10 illustrates a form of the cable assembly 10 having a first plug body 12a including prongs 14 for electrical connection with the power source, and a second plug body 12b including the secondary power outlet 16 with openings 18 for receiving prongs 20 of the power assembly 26. A cable 12c extends between the first and second plug bodies 12a, 12b for providing the electrical power therebetween.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A cable assembly for use with an electrical device, the cable assembly comprising:
a first portion for receipt of input power from a power source;
a second portion for electrical coupling with and for providing output power to the electrical device; and
switch circuitry electrically coupled between the first and second portions, the switch circuitry momentarily utilizing a current to power the switch circuitry in order to switch the cable assembly to an on state and to electrically couple the first portion with the second portion, wherein the output power is delivered to the electrical device when the cable assembly is in the on state, wherein the switch circuitry is operable to automatically disconnect input power from the electrical device.

2. The cable assembly of claim 1 including a plug body having a first side including the first portion in the form of prongs for electrical connection with the power source in the form of a power outlet, and having a second side in the form of a secondary power outlet for receiving prongs of the electrical device power cord for delivering electrical power thereto.

3. The cable assembly of claim 1 including a first plug body having a first side including the first portion in the form of prongs for electrical connection with the power source in the form of a power outlet, a second plug body in the form of a secondary power outlet for receiving prongs of the electrical device power cord for delivering electrical power thereto, and a cable extending between the first and second plug bodies for delivering electrical power from the first plug body to the secondary power outlet and the electrical device power cord received therein.

4. The cable assembly of claim 1 wherein the switch circuitry includes a pair of relay contacts shifted into electrical contact for closing the switch circuitry to provide power to the electrical device.

5. The cable assembly of claim 4 further including a user-actuated switch, actuation of the switch providing a signal to connect the relay contacts.

6. The cable assembly of claim 5 wherein the user-actuated switch may be actuated a period of time to provide an initial connection of the relay contacts, the contacts remaining in contact for maintaining the switch circuitry in a closed position.

7. The cable assembly of claim 4 wherein the switch circuitry includes a microprocessor for recognizing the current, and the microprocessor effects connection of the relay contacts to close the switch circuitry in response to receipt of the current.

8. The cable assembly as recited in claim 1 wherein the cable assembly consumes substantially no power when the input portion is not coupled with the output portion.

9. The cable assembly as recited in claim 1 further comprising:
pulse monitoring circuitry operable to monitor pulses and drive the switch circuitry based thereon.

10. The cable assembly as recited in claim 9 further comprising a transformer, wherein the pulse monitoring circuitry is operable to monitor pulses from the transformer and drive the internal switching circuitry based thereon.

11. The cable assembly as recited in claim 10 wherein the transformer includes a primary winding and a secondary winding, and the pulse monitoring circuitry is operable to monitor pulses from the secondary winding and drive the internal switching circuitry based thereon.

12. The cable assembly as recited in claim 1 further comprising a user-actuated switch, wherein the user-actuated switch may be momentarily actuated to provide the current momentarily utilized by the switch circuitry.

13. The cable assembly as recited in claim 1 further comprising a third portion for electrical connection with the electrical device, wherein the current momentarily utilized by the switch circuitry is received from the electrical device via the third portion.

14. The cable assembly as recited in claim 1 wherein the switch circuitry is operable to automatically disconnect input power from the electrical device after a predetermined amount of time.

15. The cable assembly as recited in claim 1 wherein the switch circuitry is operable to automatically disconnect input power from the electrical device in response to a reduced power state of the electrical device.

16. The cable assembly as recited in claim 1 further comprising a third portion for electrical connection with the electrical device, wherein the switch circuitry is operable to automatically disconnect input power from the electrical device in response to an electrical signal received via the third portion.

17. A cable assembly for use with an electrical device having an on-board battery, the electrical device including a charger having a power plug for receiving power and a connector for removable connection with the electrical device for delivering power to the battery, and the electrical device including a connector port for electrical connection with further devices, the cable assembly comprising:
a plug body including prongs for electrical connection with a power outlet to receive input power therefrom;
a socket for receipt of and electrical connection with the charger power plug for delivering output power thereto, the charger converting said output power and delivering power to the laptop computer battery;
a cord having a first end extending from the plug body;
a plug connected at a second end of the cord, the plug being receivable in the electrical device connector port for receiving an electrical signal therefrom;
a switch circuitry electrically connected with the plug, the switch circuitry automatically moving to an open position when the electrical signal from the connector port is not received by the plug, the open position cutting input power from the power outlet and cutting output power to the charger power plug.

18. The cable assembly of claim 17 wherein the plug is configured as a USB plug electrically connectable to the connector port in the form of a USB port.

19. The cable assembly of claim 17 wherein, the switch circuitry includes a microprocessor that monitors the electrical signal and that opens and closes the switch circuitry to disconnect or connect the output power to the electrical device power cord.

20. The cable assembly of claim 17 wherein the switch circuitry includes first and second contacts, at least one of the contacts being physically movable to effect connection and disconnection of an electrical path through the first and second contacts, wherein the switch circuitry at least maintains the contacts in physical and electrical connection when the electrical signal is received from the plug.

21. The cable assembly of claim 20 wherein the switch circuitry automatically disconnects the contacts in the absence of the electrical signal being received from the plug.

22. The cable assembly of claim 20 wherein the switch circuitry automatically disconnects the contacts after a predetermined period of time.

23. The cable assembly of claim 20 further including a user-operated portion for connection of the contacts to connect the input power to the output power and to permit the output power to be delivered to the charger power plug.

24. The cable assembly of claim 17 further including a user-operated switch mechanism, wherein the switch circuitry includes a microprocessor for controlling connection of the input power to the output power, whereby operation of the switch mechanism by a user provides a signal to the microprocessor portion for connecting the input power to the output power.

25. The cable assembly as recited in claim 17 wherein the cable assembly consumes substantially no power when the switch circuitry is in the open position.

26. In combination with an electrical device, a cable assembly for connecting and disconnecting electrical power to the electrical device, the system comprising:
an input portion for connection with a power source for receiving input electrical power;
a converter portion including converter circuitry for converting electrical power; and
switch circuitry for controlling an on and an off state for the system, wherein the switch circuitry automatically disconnects the input electrical power to switch the system to the off state in response to a reduced power state of the electrical device,
wherein the cable assembly consumes substantially no power while in the off state.

27. The combination of claim 26 wherein the switch circuitry monitors power draw from the electrical device indicating an on state for the electrical device, and the switch circuitry disconnects the input electrical power to switch the cable assembly to an off state.

28. The combination of claim 26 further comprising:
at least a first control line for electrical connection between the electrical device and the switch circuitry, the switch circuitry receiving an electrical signal from the control line, wherein the switch circuitry determines, based on the electrical signal, whether the input electrical power should be connected to the electrical device.

29. The combination of claim 28 wherein the switch circuitry connects the input electrical power to the system in response to receiving the electrical signal from the control line.

30. The combination of claim 26 wherein the cable assembly includes a connector for removable connection with the electrical device, the connector having a pair of electrical conductors for delivering electrical power to the electrical device and at least one control line for providing an on state for the system.

31. The cable assembly as recited in claim 26 further comprising:
  pulse monitoring circuitry operable to monitor pulses and drive the switch circuitry based thereon.

32. The cable assembly as recited in claim 31 further comprising a transformer, wherein the pulse monitoring circuitry is operable to monitor pulses from the transformer and drive the internal switching circuitry based thereon.

33. The cable assembly as recited in claim 32 wherein the transformer includes a primary winding and a secondary winding, and the pulse monitoring circuitry is operable to monitor pulses from the secondary winding and drive the internal switching circuitry based thereon.

34. In combination with an electrical device, a cable assembly for connecting and disconnecting electrical power to the electrical device, the system comprising:
  an input portion for connection with power source for receiving input electrical power;
  a converter portion including converter circuitry for converting electrical power; and
  switch circuitry for controlling an on and an off state for the system, wherein the switch circuitry automatically connects the input electrical power to switch the system to the on state,
  wherein the cable assembly consumes substantially no power while in the off state.

35. The combination of claim 34 further comprising:
  at least a first control line for electrical connection between the electrical device and the switch circuitry, the switch circuitry receiving an electrical signal from the control line, wherein the switch circuitry determines, based on the electrical signal, whether the input electrical power should be connected to the electrical device.

36. The combination of claim 35 wherein the switch circuitry connects the input electrical power to the system in response to receiving the electrical signal from the control line.

37. The combination of claim 34 wherein the cable assembly includes a connector for removable connection with the electrical device, the connector having a pair of electrical conductors for delivering electrical power to the electrical device and at least one control line for providing an on state for the system.

38. The combination of claim 34 wherein the switch circuitry automatically disconnects the input electrical power to switch the system to the off state.

39. The cable assembly as recited in claim 34 further comprising:
  pulse monitoring circuitry operable to monitor pulses and drive the switch circuitry based thereon.

40. The cable assembly as recited in claim 39 further comprising a transformer, wherein the pulse monitoring circuitry is operable to monitor pulses from the transformer and drive the internal switching circuitry based thereon.

41. The cable assembly as recited in claim 40 wherein the transformer includes a primary winding and a secondary winding, and the pulse monitoring circuitry is operable to monitor pulses from the secondary winding and drive the internal switching circuitry based thereon.

42. The combination of claim 34 wherein the switch circuitry monitors power draw from the electrical device indicating an on state for the electrical device, and the switch circuitry disconnects the input electrical power to switch the cable assembly to an off state.

43. In combination with an electrical device, a cable assembly for connecting and disconnecting electrical power to the electrical device, the system comprising:
  an input portion for connection with a power source for receiving input electrical power;
  a converter portion including a transformer and converter circuitry for converting the input electrical power to output electrical power;
  sensing circuitry for measuring current drawn from the cable assembly by the electrical device; and
  switch circuitry for switching the cable assembly between a fully-powered state and a reduced power state, wherein the switch circuitry automatically switches the cable assembly to the reduced power state in response to a reduced current draw by the electrical device and without regard to an output voltage of the cable assembly, the switch circuitry disconnecting power from the transformer when in the reduced power state.

44. The combination of claim 43, wherein, when the cable assembly is in the reduced power state, the power consumed by the cable assembly is on the order of microwatts.

45. The cable assembly as recited in claim 43 further comprising:
  pulse monitoring circuitry operable to monitor pulses and drive the switch circuitry based thereon.

46. The cable assembly as recited in claim 45 further comprising a transformer, wherein the pulse monitoring circuitry is operable to monitor pulses from the transformer and drive the internal switching circuitry based thereon.

47. The cable assembly as recited in claim 46 wherein the transformer includes a primary winding and a secondary winding, and the pulse monitoring circuitry is operable to monitor pulses from the secondary winding and drive the internal switching circuitry based thereon.

48. In combination with an electrical device, a cable assembly for connecting and disconnecting electrical power to the electrical device, the system comprising:
  an input portion for connection with a power source for receiving input electrical power;
  a converter portion including a transformer and converter circuitry for converting the input electrical power to output electrical power;
  switch circuitry for controlling an on and an off state for the system, the switch circuitry including a latching relay coupled to electrically connect or disconnect power to or from the transformer.

49. The combination of claim 48, wherein, when the cable assembly is in the reduced power state, the power consumed by the cable assembly is on the order of microwatts.

50. The cable assembly as recited in claim 48 further comprising:
  pulse monitoring circuitry operable to monitor pulses and drive the switch circuitry based thereon.

51. The cable assembly as recited in claim 50 further comprising a transformer, wherein the pulse monitoring circuitry is operable to monitor pulses from the transformer and drive the internal switching circuitry based thereon.

52. The cable assembly as recited in claim 51 wherein the transformer includes a primary winding and a secondary winding, and the pulse monitoring circuitry is operable to monitor pulses from the secondary winding and drive the internal switching circuitry based thereon.

* * * * *

(12) INTER PARTES REEXAMINATION CERTIFICATE (1208th)
United States Patent
McGinley et al.

(10) Number: US 7,960,648 C1
(45) Certificate Issued: Dec. 1, 2015

(54) ENERGY SAVING CABLE ASSEMBLIES

(75) Inventors: James W. McGinley, Barrington, IL (US); Donald Rimdzius, Addison, IL (US); Valerie McGinley, Barrington, IL (US); Dominic James Hogan, Appleton, WI (US)

(73) Assignee: VOLTSTAR TECHNOLOGIES, INC., Schaumburg, IL (US)

Reexamination Request:
No. 95/002,378, Sep. 14, 2012

Reexamination Certificate for:
Patent No.: 7,960,648
Issued: Jun. 14, 2011
Appl. No.: 12/251,882
Filed: Oct. 15, 2008

Related U.S. Application Data

(63) Continuation-in-part of application No. 12/176,261, filed on Jul. 18, 2008, now Pat. No. 7,910,834, which is a continuation-in-part of application No. 12/127,592, filed on May 27, 2008, now Pat. No. 7,910,833.

(51) Int. Cl.
*H01B 11/06* (2006.01)
*H01R 31/06* (2006.01)
*G06F 1/26* (2006.01)
*H01R 13/703* (2006.01)
*H01R 13/66* (2006.01)

(52) U.S. Cl.
CPC ............... *H01R 31/065* (2013.01); *G06F 1/26* (2013.01); *G06F 1/263* (2013.01); *H01R 13/6675* (2013.01); *H01R 13/7038* (2013.01); *Y10T 307/832* (2015.04)

(58) Field of Classification Search
None
See application file for complete search history.

(56) References Cited

To view the complete listing of prior art documents cited during the proceeding for Reexamination Control Number 95/002,378, please refer to the USPTO's public Patent Application Information Retrieval (PAIR) system under the Display References tab.

*Primary Examiner* — James Menefee

(57) ABSTRACT

A cable assembly for use with any power cable for an electrical device, the cable assembly including a remotely locatable switch for connecting or disconnecting the electrical device from power draw. Also, a cable assembly for a power device such as a charger for providing output power to an electronic device is disclosed, the cable assembly including two pairs of wires wherein a first pair provides output power for the electronic device and a second pair includes a switch for turning off the charger. The cable assembly allows the switch to be located remotely from a charger housing for the converter circuitry and remotely from a power source such as an outlet, and allows the switch to be generally co-located with and operable at the connector for connecting the power device with the electronic device.

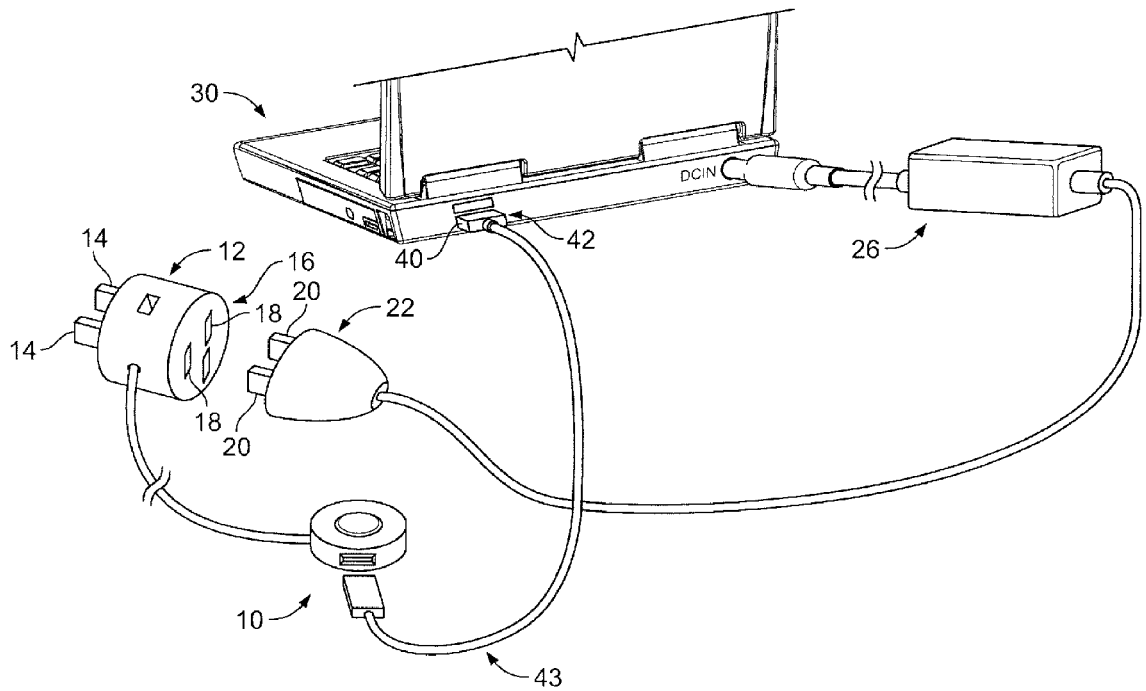

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-30, 34-38 and 42-49 are cancelled.

Claims 31-33, 39-41 and 50-52 are determined to be patentable as amended.

31. The cable assembly as recited in claim 26 further comprising:
pulse monitoring circuitry operable to monitor *the frequency of* pulses and drive the switch circuitry based thereon.

32. The cable assembly as recited in claim 31 further comprising a transformer, wherein the pulse monitoring circuitry is operable to monitor *the frequency of* pulses from the transformer and drive the internal switching circuitry based thereon.

33. The cable assembly as recited in claim 32 wherein the transformer includes a primary winding and a secondary winding, and the pulse monitoring circuitry is operable to monitor *the frequency of* pulses from the secondary winding and drive the internal switching circuitry based thereon.

39. The cable assembly as recited in claim 34 further comprising:
pulse monitoring circuitry operable to monitor *the frequency of* pulses and drive the switch circuitry based thereon.

40. The cable assembly as recited in claim 39 further comprising a transformer, wherein the pulse monitoring circuitry is operable to monitor *the frequency of* pulses from the transformer and drive the internal switching circuitry based thereon.

41. The cable assembly as recited in claim 40 wherein the transformer includes a primary winding and a secondary winding, and the pulse monitoring circuitry is operable to monitor *the frequency of* pulses from the secondary winding and drive the internal switching circuitry based thereon.

50. The cable assembly as recited in claim 48 further comprising:
pulse monitoring circuitry operable to monitor *the frequency of* pulses and drive the switch circuitry based thereon.

51. The cable assembly as recited in claim 50 further comprising a transformer, wherein the pulse monitoring circuitry is operable to monitor *the frequency of* pulses from the transformer and drive the internal switching circuitry based thereon.

52. The cable assembly as recited in claim 51 wherein the transformer includes a primary winding and a secondary winding, and the pulse monitoring circuitry is operable to monitor *the frequency of* pulses from the secondary winding and drive the internal switching circuitry based thereon.

\* \* \* \* \*